United States Patent [19]

Elchinger

[11] 4,280,204
[45] Jul. 21, 1981

[54] MOBILITY CANE FOR THE BLIND INCORPORATING ULTRASONIC OBSTACLE SENSING APPARATUS

[75] Inventor: Gilbert M. Elchinger, Cambridge, Mass.

[73] Assignee: Polaroid Corporation, Cambridge, Mass.

[21] Appl. No.: 45,783

[22] Filed: Jun. 5, 1979

[51] Int. Cl.³ .............................................. G01S 15/88
[52] U.S. Cl. .................................... 367/116; 367/910; 343/5 BL; 135/76; 135/DIG. 11
[58] Field of Search .................... 367/116, 910, 2, 128; 135/65, 76, DIG. 11; 343/5 BL

[56] References Cited

U.S. PATENT DOCUMENTS

| | | |
|---|---|---|
| 2,496,639 | 2/1950 | Richardt, Jr. et al. .............. 367/116 |
| 3,321,737 | 5/1967 | Russell ................................. 367/116 |
| 3,546,467 | 12/1970 | Benjamin, Jr. et al. ........... 135/65 X |
| 3,984,803 | 10/1976 | Hawk et al. .............................. 367/2 |

FOREIGN PATENT DOCUMENTS 229256  2/1969  U.S.S.R. .................................... 367/910

OTHER PUBLICATIONS

Kuhl, *Acoustica*, vol. 4, 1954, pp. 519–532.
Muggli, U.S. Pat. Application Ser. No. 3,371, filed Jan. 15, 1979.

*Primary Examiner*—Richard A. Farley
*Attorney, Agent, or Firm*—John J. Kelleher

[57] ABSTRACT

A conventional mobility cane for the blind incorporates a compact, dual-mode, ultrasonic obstacle detection sensor that includes a combination transmitting and receiving, capacitance type electrostatic transducer. The size of the protective zone associated with said sensor is infinitely variable. In one mode, the sensor warns of low lying objects that might contact the upper extremities of an ambulatory mobility cane user. In another mode, the user can determine the presence or absence of more remote objects. Means are provided for readily alternating between said object sensor modes.

11 Claims, 11 Drawing Figures

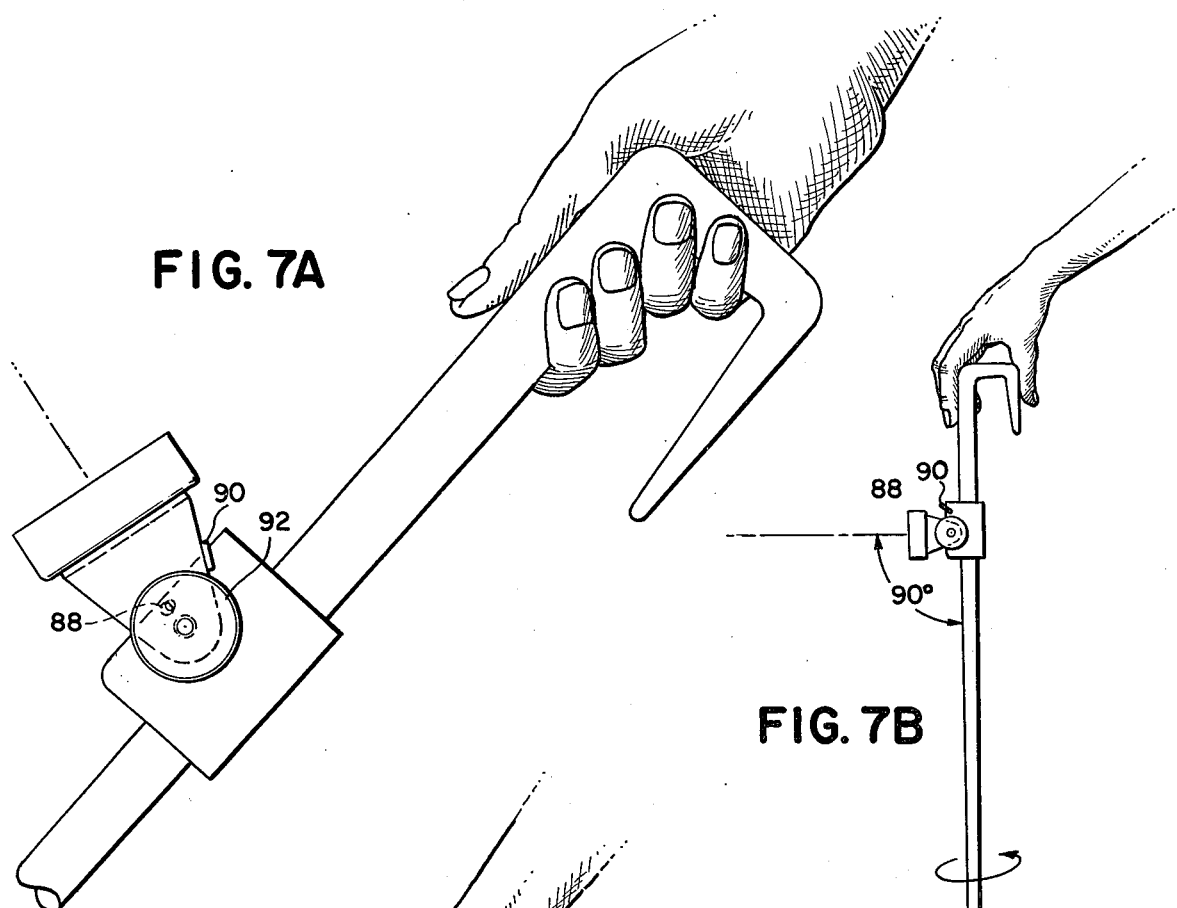
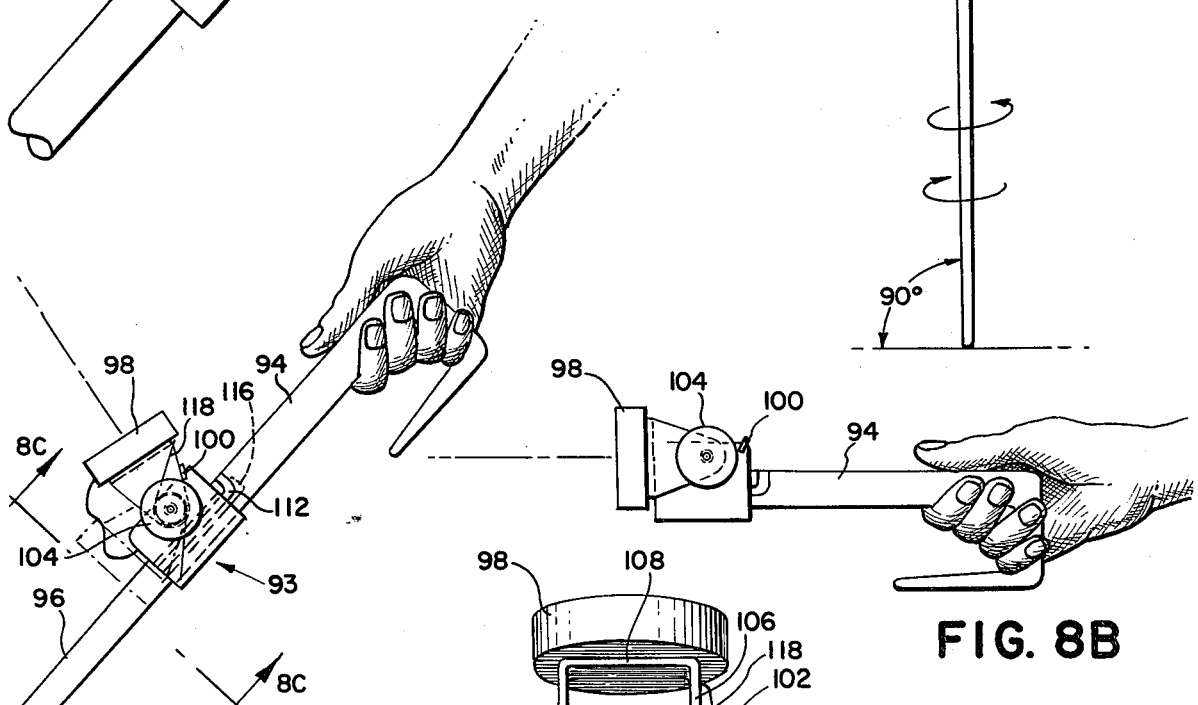

MOBILITY CANE FOR THE BLIND INCORPORATING ULTRASONIC OBSTACLE SENSING APPARATUS

BACKGROUND OF THE INVENTION

1. Field of the Invention

This invention relates to mobility canes for sightless persons in general, and to such canes incorporating ultrasonic obstacle detection apparatus, in particular.

2. Description of the Prior Art

Mobility canes incorporating range extending devices for sensing potential obstacles to blind, ambulatory users of such canes have been disclosed in the prior art.

In U.S. Pat. No. 3,546,467 to BENJAMIN, JR., et al., a relatively costly and complex mobility cane utilizing a plurality of aesthetically objectionable, object detecting, coherent light (laser) sensor pairs, is described. Highly directional transmitting and receiving sensors are mounted in a spaced relation on the cane shank. The ability to adjust the object sensors to the desired maximum object detection range is dependent upon the ability to mechanically set the angular position of each sensor with respect to said cane shank. The protective zone provided to a cane user with this arrangement is quite limited in that an object must actually intersect a relatively narrow light beam in order to be detected. Also, objects lower than the maximum laser sensor object detection height will be detected closer to a cane user than more elevated objects, and said user may not be able to react in sufficient time to avoid object contact.

U.S. Pat. No. 2,496,639 to RICHARDT, JR., et al., discloses a mobility cane employing a pair of ultrasonic energy transmitting and receiving piezoelectric transducers. This particular cane is less complex and has a greater protective zone for a transducer pair than that of the above-mentioned BENJAMIN, JR., et al. cane; however, it suffers all of the other shortcomings of said BENJAMIN, JR., et al. mobility cane.

Ultrasonic range finders for detecting the presence of, and the distance to, a subject to be photographed have also been disclosed in the prior art. In U.S. patent application Ser. No. 3,371, filed Jan. 15, 1979, by J. MUGGLI, an ultrasonic range finder having a combination transmitting and receiving, capacitance type, electrostatic transducer, is incorporated in a photographic camera for the purpose of determining the distance to a subject and then causing the adjustable focus lens of said camera to be focused in accordance with a signal representative of subject distance derived by said range finder.

SUMMARY OF THE INVENTION

In accordance with the teachings of the present invention, a conventional mobility cane for a visually impaired person incorporates ultrasonic object sensing apparatus that will provide a blind, ambulatory user of said cane with the capability of sensing the presence of movement impeding obstacles entering a spatial zone whose size is infinitely variable. The sensing apparatus includes an adjustably mounted combination transmitting and receiving, capacitance type, electrostatic transducer having an energy transmission/reception pattern that approximates the maximum size of said spatial zone. In one mode, the sensor warns of low-lying objects that might contact the upper extremities of an ambulatory mobility cane user. In another mode, the cane user can determine the presence and/or absence of more remote objects and means are provided for readily alternating between said object sensing modes.

BRIEF DESCRIPTION OF THE DRAWINGS

FIG. 7A is an enlarged side view, in elevation, of the adjustable transducer-to-mobility cane mounting apparatus of the present invention.

FIG. 7B is a side elevational view of the mobility cane of the present invention showing said cane and the transducer portion of the obstacle sensing apparatus of the present invention in its remote obstacle sensing position.

FIG. 8A is an enlarged side view of a portion of a two-piece version of the mobility cane of the present invention, held in its normal elevated obstacle detection position.

FIG. 8B shows the cane of FIG. 8A with its shank portion removed and the remote obstacle sensing position in which the transducer of said cane is placed after said shank portion is so removed.

FIG. 8C is a sectional view taken along the line 8C—8C in FIG. 8A.

DESCRIPTION OF THE PREFERRED EMBODIMENTS

Figure 1:
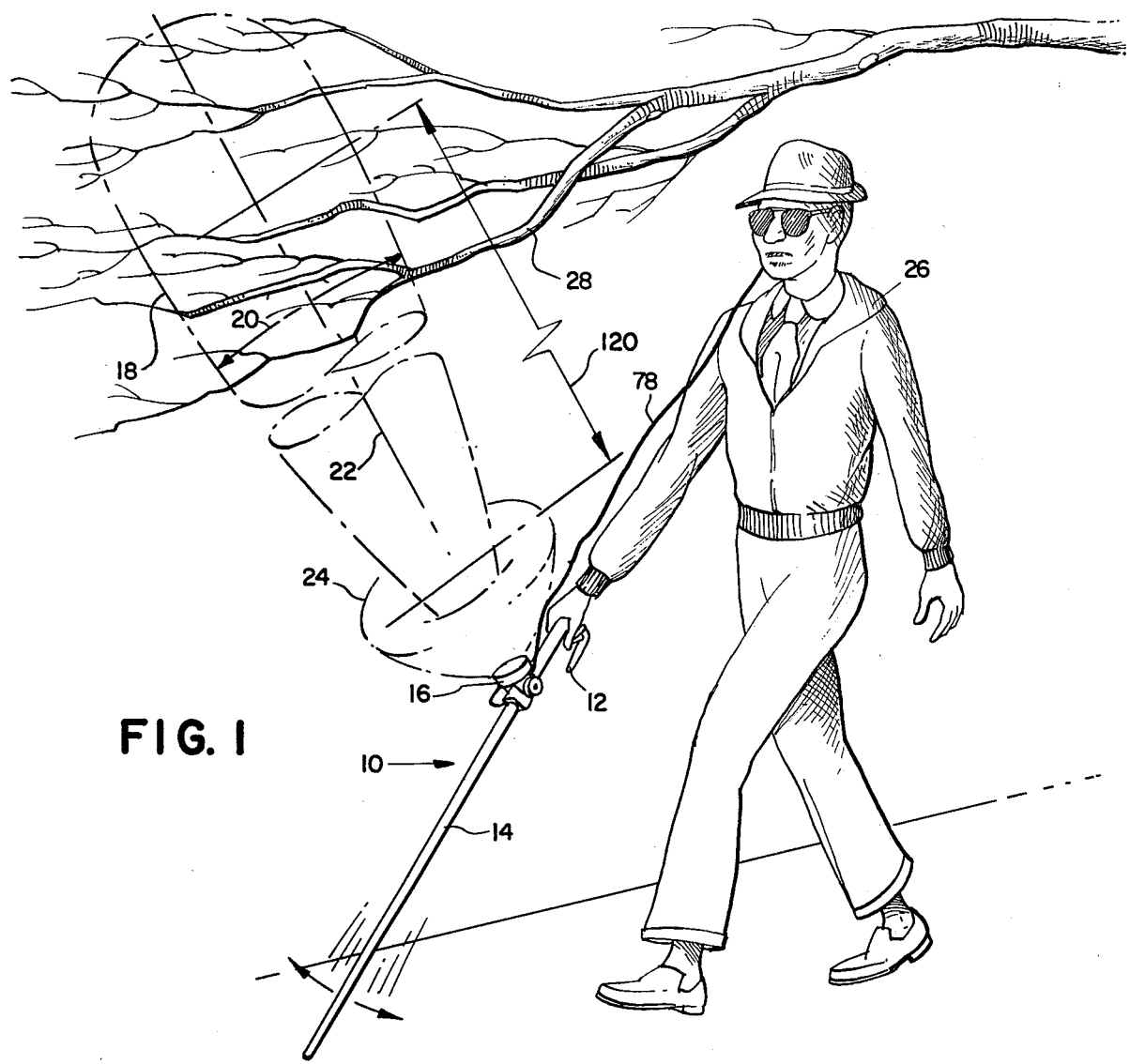
FIG. 1 shows an ambulating visually impaired person detecting a low-lying obstacle with the mobility cane of the present invention and shows the spatial zone within which said cane will detect such objects.
Figure 2:
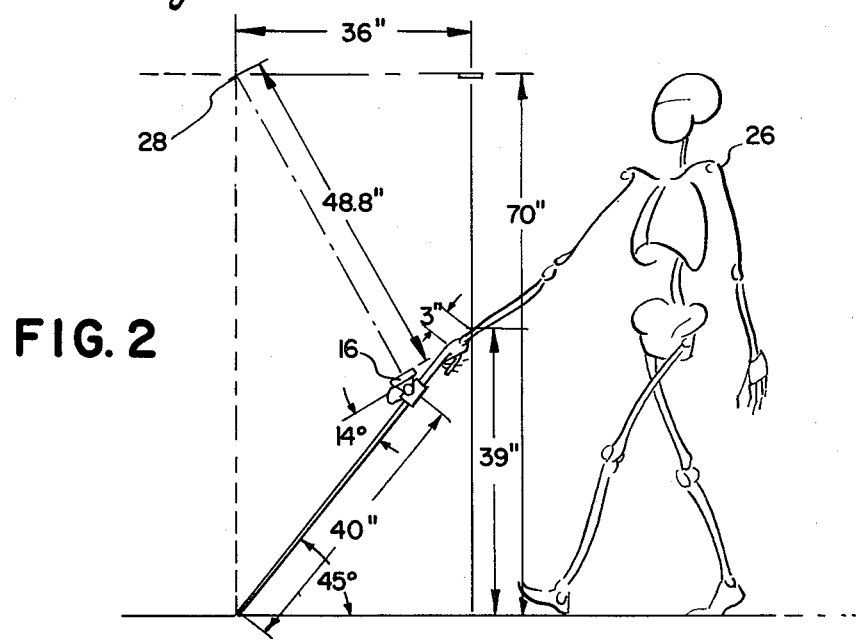
FIG. 2 is a schematic diagram showing the mobility cane of the present invention and an optimum orientation of said cane for the person of FIG. 1.

Referring now to the drawings, and specifically to FIGS. 1 and 2, reference numeral 10 designates a preferred embodiment of the mobility cane of the present invention. Cane 10 includes handle portion 12 and shank portion 14, and portions being of generally conventional design. Cane 10 also includes combination transmitting and receiving, capacitance type, electrostatic transducer 16 adjustably mounted on shank portion 14 of said cane 10 near handle portion 12. Transducer 16 transmits and receives a directional, multiple lobe pattern of ultrasonic energy whose contours are fairly well understood in the prior art. The multiple lobe transducer pattern of a transducer with a circular backplate of 3.5 cm in diameter consists of central lobe 18 having a lobe angle 20 of approximately 12° at its half power point ($-3$ dB) when operated at a frequency of 50 KHz, with said central lobe 18 being generally symmetrical about lobe axis 22, and a plurality of smaller magnitude side lobes 24 (only one shown) that are also generally symmetrical about said lobe axis 22. This electrostatic transducer, multiple lobe pattern is described in much greater detail in the above-cited MUGGLI application and in an article by W. KUHL, et al. entitled "Condenser Transmitters and Microphones with Solid Dielectric Airborne Ultrasonics" in Acustica, Vol. 4, 1954, pages 519–532.

Cane 10 is manipulated from side to side in a conventional manner by a visually impaired cane user in order to provide said user with tactile and aural information relating to the presence and/or absence of low-lying impediments to ambulatory movement, the generation of such information being the primary function of a conventional mobility cane. An additional feature of cane 10 is that it can provide a person such as cane user 26 with information relating to the presence and/or absence of elevated obstacles to ambulatory movement such as elevated obstacle 28. The specific details of the elevated obstacle detection apparatus of cane 10 will be described below.

A visually impaired person will normally select a mobility cane whose overall length is proportional to his or her height. In order to facilitate describing a mobility cane incorporating the obstacle detection apparatus of the present invention, it will be assumed that cane user 26 has a height of 70 inches. A person of this height would normally select a mobility cane having an overall length of approximately 50 inches. For optimum obstacle detection, the longitudinal axis of the shank portion 14 of mobility cane 10 is maintained at an angle of approximately 45° with respect to the horizontal by user 26 as said cane 10 is moved from side to side for low-lying obstacle detection.

For the optimum detection of elevated obstacle 28 with cane 10, which is an obstacle that is at the same height as that of cane user 26 and approximately three feet in front of said cane user's hand, transducer 16 should be mounted approximately 40 inches from the end of cane 10 and positioned such that a plane through the backplate of said transducer 16 will form an angle of approximately 14° with respect to the longitudinal axis of shank portion 14 of said cane 10.

The maximum spatial zone within which an elevated obstacle will be detected by the obstacle detection apparatus of the present invention approximates the space encompassed by the lobes of transducer 16. An important feature of the elevated obstacle detection apparatus of the present invention is the ability to infinitely vary the depth of this spatial zone. A signal flow block diagram showing how the depth of said spatial zone is so varied is presented in FIG. 3.

A gated voltage proportional to obstacle distance is generated by a voltage ramp and sampling scheme. When power switch 30 is manually closed, power is applied to system cycle programmer 32, and to other object detection system components, from a battery (not shown) connected to terminal 33, causing said system cycle programmer 32 to divide-down the high frequency output of crystal oscillator 34 into a transmit and reset pulse train having the same pulse repetition frequency, but shifted in phase. Power switch 30 is preferably of the type that automatically closes when grasped by a cane user and opens when said cane user's grasp is released. Transmit pulses produced at output 36 are designated XMT. The reset pulses produced at output 38 and designated RST, are the same as the XMT pulses, but are delayed with respect to the XMT pulses by about 100 ms, which is greater than the round trip time for sonic energy, under normal conditions of temperature and pressure, for objects at a distance of approximately 24 feet from transducer 16. This arrangement will allow any echo from an object within 24 feet of said transducer 16 to be received in the time interval between successive RST pulses or before a subsequent XMT pulse.

Transmit and blanking generator 40, to which the XMT pulses and the output of oscillator 34 are applied, operates similar to the corresponding component in the ultrasonic ranging system described in the above-cited MUGGLI application, which is to cause transducer 16 to transmit periodic ultrasonic bursts of energy, two of which are illustrated at 42a and 42b. An echo of ultrasonic burst of energy 42a from a movement impeding obstacle, indicated at 44a, is received by transducer 16 where said echo, in the form of an electrical signal, is routed to receiver amplifier 46 in the manner described in said MUGGLI application. The output of receiver amplifier 46 is detected by receiver detector 48 to produce an echo pulse 50 such that the time between the transmission of ultrasonic burst of energy 42a and echo pulse 50 resulting from echo 44a of said ultrasonic burst of energy 42a is proportional to the distance between an obstacle and transducer 16.

While an ultrasonic burst of energy is being generated by transducer 16 in response to transmit and blanking generator 40, the input to receiver amplifier 46 is clamped at a fixed potential to prevent the simultaneous generation of a false receive pulse 50 by receiver detector 48 which is connected to transducer 16 through said generator 40. The clamp is removed so that an echo of the ultrasonic energy that was transmitted while said clamp was applied, can be detected. This clamp is alternately applied and removed for each transmitted ultrasonic energy burst.

In addition to transmit and blanking generator 40, the output from crystal oscillator 34 is also applied to the input of square wave generator 52. Square wave generator 52, in turn, produces a continuous train of periodic pulses having the same frequency as the output of oscillator 34. The output of square wave generator 52, and the XMT and RST pulses from programmer 32 are applied to ramp generator 54. Ramp generator 54 integrates the square wave voltage pulses from square wave generator 52 and produces a constant slope or ramp voltage at its output that is the integral of the square wave pulses at its output over a specific interval of time. The voltage ramp is initiated when an XMT pulse is applied to ramp generator 54 and said ramp voltage is reduced to zero when an RST pulse is subsequently applied to said ramp generator 54.

The output voltage of ramp generator 54 is applied to the input of gate 56 which is a normally open (non-conducting) device. When echo pulse 50 is generated by detector 48 and applied to gate 56, said gate 56 will conduct for a very short period of time, a length of time that very closely approximates the pulse width time of said echo pulse 50. The magnitude of the output voltage of gate 56 when said gate 56 has been rendered conductive by echo pulse 50, is proportional to the distance to the object from which an echo of an immediately previous transmitted burst of ultrasonic energy was reflected. An echo received by transducer 16 from a close object in a short period of time would cause a lower voltage to appear at the output of gate 56 than an echo received by said transducer from a more distant object in a relatively longer period of time.

The gated ramp output voltage of gate 56 is applied to a hold capacitor (not shown) within hold circuit 58 where it is held at a constant value until an RST pulse is applied to said hold circuit 58 at the end of an ultrasonic energy burst transmit/receive cycle. The RST pulse, so applied, causes the voltage on said capacitor to be reduced to zero. The voltage on the hold capacitor within hold circuit 58 is applied to voltage controlled sine wave oscillator 60 and the output of said oscillator 60 is amplified by amplifier 62 and is then applied to the input of normally open gate 64 and to terminal 66 of manually actuatable range select switch 68. The output frequency of voltage controlled oscillator 68 is inversely proportional to the input voltage to said oscillator 60. The voltage on the hold capacitor within hold circuit 58 is also applied to an adjustable comparator 70 that incorporates an internally generated, manually adjustable reference voltage whose function is to limit the maximum detection range of the obstacle detection apparatus of the present invention. The output voltage from hold circuit 58 is compared with said adjustable comparator 70 reference voltage and so long as the voltage at the output of hold circuit 58 is less than said reference voltage there will be a voltage at the output of comparator 70 that will cause gate 64 to conduct. Once the voltage at the output of hold circuit 58 equals or exceeds the reference voltage of comparator 70, the output voltage of said comparator 70 is reduced to zero causing gate 64 to revert back to its normally nonconductive state. When gate 64 is conductive, its output is applied to terminal 72 of range select switch 68. When movable contact 74 of said switch 68 is in contact with switch terminal 66, an audible signal, inversely proportional to subject distance, is routed to a set of earphones 76 and to a cane 10 user (FIG. 1) through readily detachable cord 78 connected between said earphones 76 and movable contact 74 of said switch 68. When movable contact 74 of switch 68 is in contact with terminal 72 and not in contact with terminal 66, an audible signal inversely proportional to subject distance will also be routed to earphone 76 through cord 78. However, the obstacle detection range within which said audible signal will be heard by a cane 10 user will be limited by the magnitude of the manually controlled reference voltage setting of adjustable comparator 70, a range that is normally limited to approximately five feet from transducer 16 or to approximately one foot above the head of a cane user and approximately three feet in front of said cane user's cane-holding hand.

Figure 3:
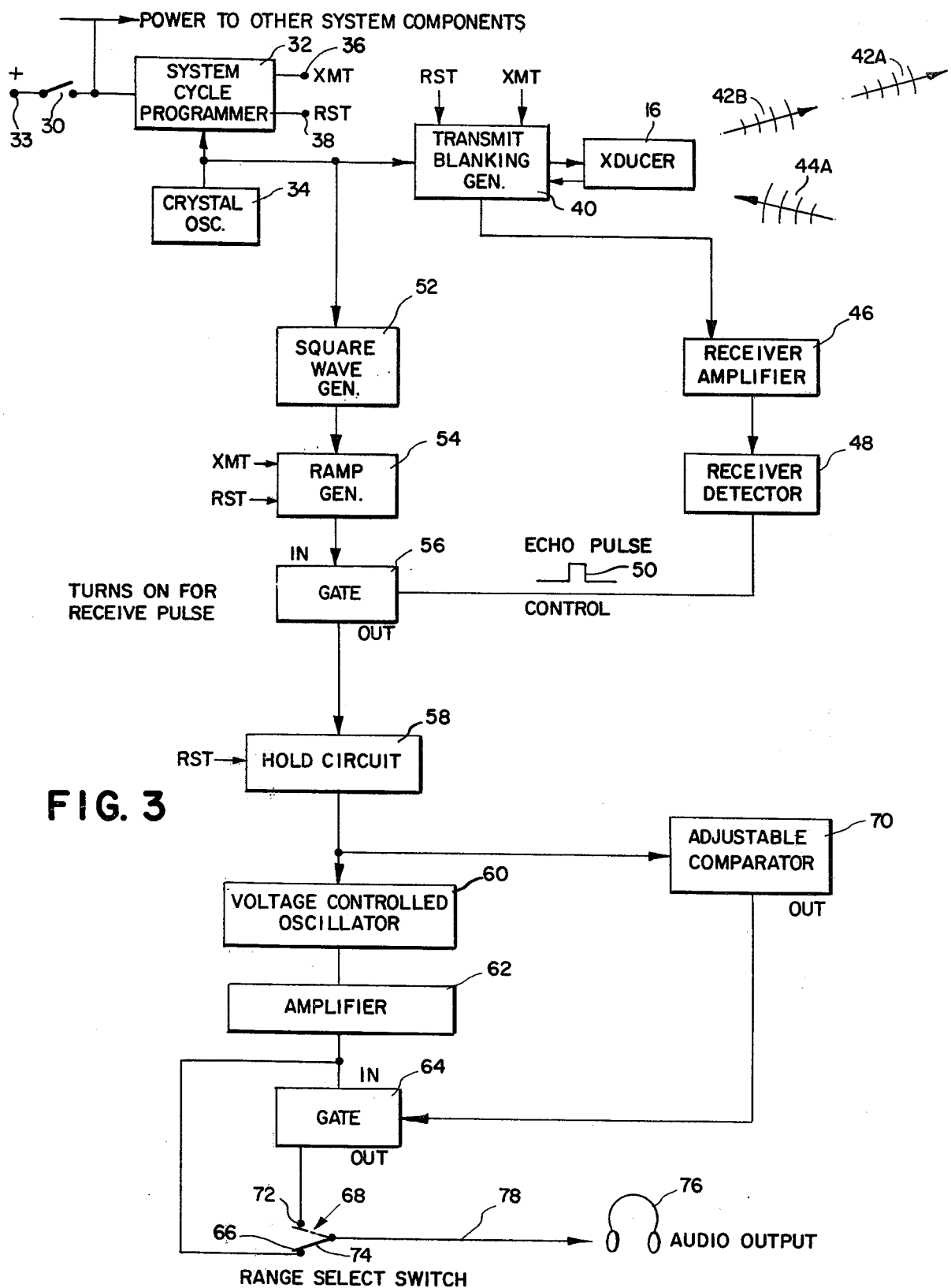
FIG. 3 is a signal flow block diagram of the ultrasonic obstacle sensing apparatus incorporated in the mobility cane of FIGS. 1 and 2.

A visually impaired person is more likely to use a mobility cane that looks conventional over one that does not, even though said person is seldom able to visually determine any difference in mobility cane appearance. With the exception of transducer 16, power switch 30, a portion of range select switch 68, earphones 76 and cord 78, all of the obstacle detection apparatus depicted in FIG. 3 is concealed within the handle end of mobility cane 10. One of the more obvious differences between a conventional mobility cane and the mobility cane of the present invention is cord 78 that connects the output of range select switch 68 to earphones 76. An embodiment of the mobility cane of the present invention that eliminates the need for a cord such as cord 78 in FIG. 3, is depicted in FIGS. 4-6.

Figures 4, 5, 6:
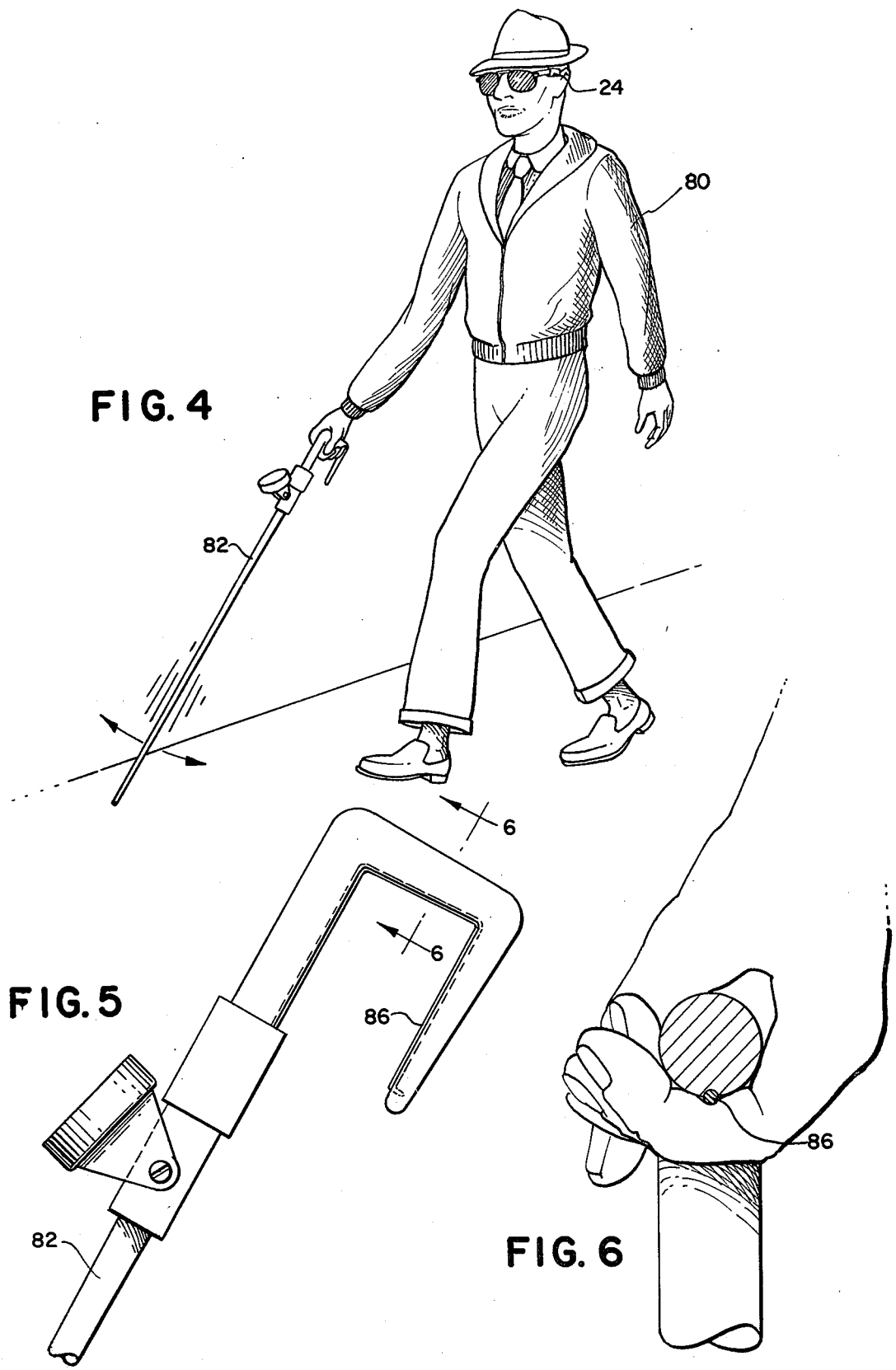
FIG. 4 depicts an ambulatory visually impaired person carrying the mobility cane of the present invention that additionally incorporates a cane-mounted obstacle warning signal AM transmitter, and an obstacle warning signal AM receiver that is attached to said person's ear.
FIG. 5 is an enlarged side view of the mobility cane handle and transducer of FIG. 4 showing the AM transmitter's antenna disposed along an outer surface of said handle.
FIG. 6 is a sectional view taken along the line 6—6 in FIG. 5 that additionally shows the hand of a cane user in physical contact with the antenna of FIG. 5.

In FIG. 4, visually impaired ambulatory person 80 is manipulating mobility cane 82, a cane that incorporates the elevated obstacle detection apparatus of the present invention. A conventional AM transmitter (not shown) is concealed within said cane 82 and a conventional AM receiver 84, capable of receiving obstacle detection signals from said transmitter, is clipped to the ear of said ambulatory person 80. The input of the AM transmitter is electrically connected to movable contact 74 of range select switch 68 (FIG. 3) and the output of said AM transmitter is electrically connected to antenna 86 mounted on an external surface of the handle of said mobility cane 82. Power to the AM transmitter is controlled by manually actuated switch 30 (FIG. 3), the switch that controls power to other components of the elevated obstacle detection apparatus. When an elevated obstacle is detected, an obstacle detection signal is transmitted by the AM transmitter through antenna 86 to AM receiver 84 where it is heard by visually impaired person 80. Antenna 86 is located on an external surface of the handle of cane 82 where it will readily contact the hand of person 80 when he grasps said handle in a conventional manner. When the hand of person 80 contacts antenna 86, said person becomes an extension of antenna 86, which results in a substantially greater coupling between the AM transmitter concealed in cane 82 and receiver 84. By improving transmitter/receiver coupling in this manner, less transmission power is required by the AM transmitter and, in addition to a reduction in power consumption which will lengthen the life of any batteries supplying power to the obstacle detection apparatus, components of the AM transmitter can be made smaller, which will result in less space being required by said transmitter within cane 82. By utilizing an AM transmitter and receiver to convey obstacle detection information to a visually impaired cane user, cane 82 looks more like a conventional mobility cane than, for example, cane 10 in FIG. 1.

Cane 10 in FIGS. 1 and 2 and/or cane 82 in FIGS. 4-6 are provided with adjustably mounted transducers that both transmit and sense the echo of a transmitted burst of ultrasonic energy, as previously explained. Referring now to FIGS. 7A and 7B, the mounting apparatus for these transducers may include a transducer position maintaining detent such as detent 88 of FIG. 7A. In addition, these transducers could also be mechanically coupled to range select switch 68 of FIG. 3 by conventional mechanical linkage (linkage not shown). If so linked, rotational movement of the transducer between its normal, elevated obstacle detection position (depicted in FIG. 7A) and its detent 88 position (depicted in FIG. 7B) would change the state of said range select switch 68 and therefore the maximum detection range of the mobility canes 10 or 82 obstacle detection apparatus. When the transducer has been rotated into its normal elevated obstacle detection position, a position that would position the transducer up against rotationally adjustable stop 90, and is maintained there by adjustable friction wheel 92, mechanically linked movable arm 74 would contact terminal 72 of range select switch 68 (FIG. 3) and place the obstacle detection apparatus of the present invention in its reduced range obstacle detection mode, a range that is primarily determined by the manually adjusted value of the previously discussed reference voltage in adjustable comparator 70 (FIG. 3). If, on the other hand, the transducer was rotated to its detent position after first loosening friction wheel 92, the longitudinal axis of the main transducer lobe, such as lobe axis 22 in FIG. 1, would form a 90° angle with the longitudinal axis of the shank of its associated mobility cane. In this detent position, mechanically linked movable arm 74 would then be in contact with terminal 66 of range select switch 68 (FIG. 3), which would place the obstacle detection apparatus of the present invention in its maximum range detection mode. When range select switch 68 (FIG. 3) is in this position, it causes the range limiting feature provided by adjustable comparator 70 (FIG. 3) and gate 64 to be bypassed. If a visually impaired person holds the mobility cane of the present invention such that the longitudinal axis of its shank portion is perpendicular to the ground when the transducer has been rotated into its detent position, as shown in FIG. 7B, and then rotates said cane about said longitudinal axis, said person will be able to detect the presence and/or absence of horizontally spaced objects within the maximum object detection range of the obstacle detection apparatus of the present invention which, in this the preferred embodiment, is approximately 24 feet.

In another embodiment of the obstacle detecting mobility cane of the present invention illustrated in FIGS. 8A, 8B and 8C, a mobility cane 93 is formed of a handle portion 94 and a shank portion 96 that can be mechanically coupled to, and uncoupled from one another. As in the mobility cane of FIGS. 7A and 7B, transducer 98 in FIGS. 8A, 8B and 8C is mechanically linked to range select switch 68 of FIG. 3 by conventional mechanical linkage. The rotational movement of transducer 98 between its normal, elevated obstacle detection position depicted in FIG. 8A, and the position depicted in FIG. 8C, which will hereinafter be referred to as the "flashlight" position, will change the state of said range select switch 68 and the obstacle detection range of mobility cane 93. When transducer 98 has been rotated into its normal, elevated object detection position as shown in FIG. 8A, movable arm 74, which is mechanically linked to transducer 98, would contact terminal 72 of range select switch 68 (FIG. 3) and place the obstacle detection apparatus of the present invention in its reduced range obstacle detection mode. When transducer 98 is rotated into its "flashlight" position, said mechanically linked movable arm 74 would then be in contact with terminal 66 of range select switch 68 (FIG. 3), which would place the obstacle detection apparatus of the present invention in its maximum range detection mode.

As shown in FIGS. 8A and 8C, transducer 98 of cane 93 is maintained in its normal, elevated object detection position against adjustable stop 100 (adjustment not shown) by the frictional engagement of tubular portion 102 of friction adjustment wheel 104 with leg 106 of transducer support bracket 108, a member that is pivotally mounted on bracket support pin 110. When shank portion 96 of cane 93 is rotated 90° clockwise, as viewed in FIG. 8C, hooked end 112 of said shank portion 96 is able to pass through slot 114 of recess 116 in handle portion 94 so that shank portion 96 of said cane 93 can be withdrawn or separated from said handle portion 94. When cane 93 is separated into two portions, and the frictional force maintained by friction adjustment wheel 104 is reduced, transducer 98 will be rotated into its "flashlight" position, or the position shown in position 8B, by force biasing spring 118, a position where the longitudinal axis of the main lobe of said transducer 98 is parallel to the longitudinal axis of cane handle portion 94. When transducer 98 is in its said "flashlight" position, the remote object detection mode is automatically selected, as explained above, and handle portion 94 of cane 93 can then be manipulated in a manner similar to the manipulation of a hand-held flashlight for the purpose of detecting the presence of relatively remote objects that are within the approximate 24 foot maximum detection range of the object detection apparatus of cane 93. An electrical cord or AM transmitter/receiver may be incorporated in or attached to cane 93 as in canes 10 or 82, to transmit object detection information to the cane 93 user.

Cane 93 is returned to its one-piece mode by manually rotating transducer 98 into stop 100 against the force of spring 118 and then increasing the frictional force between tube portion 102 of frictional wheel 104 and support leg 106 of transducer mounting bracket 108 by rotating adjustable friction wheel 104. Once transducer 98 has been so positioned, hooked end 112 of shank portion 96 is fully inserted into opening 116 and slot 114 of handle portion 94 and then said shank portion 96 is rotated a quarter turn counterclockwise, as viewed in FIG. 8C, which places said shank portion 96 of cane 93 in a fixed position with respect to cane 93 handle portion 94. Cane 93 is now ready for conventional use and for the detection of elevated obstacles by an ambulatory cane 93 user.

DISCUSSION

A major distinguishing difference between the protective zone of the obstacle detection apparatus of the present invention and the protective zones described in the above-mentioned BENJAMIN, JR., et al. and RICHARDT, JR., et al. patents is that as the depth of the protective zone of the obstacle detection apparatus of the present invention is varied, that portion of said zone nearest the transducer and/or cane user will remain at a fixed distance from, for example, said cane user; whereas the corresponding portions of the protective zones of said BENJAMIN, JR., et al. and RICHARDT, JR., et al. patents change their positions with respect to a cane user. By maintaining the near portion of the protective zone in such a fixed position, obstacles are less likely to go undetected by the present obstacle detection apparatus.

As a consequence of using a combination transmitting and receiving ultrasonic transducer, there is a blanked zone adjacent said transducer within which objects cannot be detected by the object detection apparatus of the present invention because of the requirement that the receiver portion of said object detection apparatus be prevented from receiving a transmit signal during signal transmission for reasons that were previously discussed. Because of this requirement, the transducer transmission/reception pattern and the remote object detection mode is larger than the actual object detection zone by an amount proportional to the depth of said adjacent blanked zone. The depth of the object detecting zone of the object detection apparatus of the present invention is always measured or referenced from the outer limit of said blanked zone as is range depth 120 of the elevated object detection zone of cane 10 illustrated in FIG. 1.

The signal flow block diagram described above and depicted in FIG. 3 may be implemented with conventional analog and/or digital circuit components. Both types of circuit components can be used effectively to produce the required obstacle detection information. However, with analog circuitry it is possible to obtain better resolution of the depth of the obstacle detection or protective zone.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. A mobility cane for use by a visually impaired person, said mobility cane comprising:
    an elongated member, having a longitudinal axis, that is capable of having its said longitudinal axis maintained at a fairly constant acute angle with respect to the ground by the extended hand of an ambulatory visually impaired person; and
    ultrasonic obstacle detection apparatus mounted on said elongated member for warning said visually impaired person of elevated objects that might impede ambulatory movement, whenever such objects enter a predetermined spatial zone having a maximum and minimum spatial zone depth, said detection apparatus including,
    an adjustably mounted transmitting and receiving, capacitance type, electrostatic transducer having a particular ultrasonic energy transmission and reception pattern wherein said predetermined zone is a function of said pattern, and
    manually adjustable means for varying the depth of said predetermined zone to any one of a multiplicity of zone depths less than said maximum zone depth and greater than said minimum zone depth such that a portion of said spatial zone remains at a fixed distance from said transducer whenever said means is adjusted for the purpose of varying said spatial zone depth.

2. A mobility cane for use by a visually impaired person, comprising:
    a handle portion;
    an elongated shank portion projecting from said handle portion along a longitudinal axis, said cane intended to be extended from a cane user, during normal operations wherein said cane user is ambulating, so that its said longitudinal axis is inclined generally at a predetermined acute angle to the ground;
    energizable means on said cane for sensing objects disposed at relatively short distances in front of said cane user and suspended at elevations below the height of said cane user, said energizable means including a transducer aligned to direct a beam of ultrasonic energy from said cane along a line of direction disposed at a predetermined angle to said longitudinal axis and lying in substantially the same vertical plane with said longitudinal axis when said cane is being employed in its said normal operations;
    manually actuatable means for changing the beam direction orientation of said transducer on said cane relative to its said longitudinal axis so that it will be operative to direct said beam of energy in a generally horizontal direction when said cane is held in a preselected orientation by said cane user; and
    means responsive to the manual actuation of said transducer orientation changing means for substantially increasing the range sensitivity of said energizable means to facilitate the sensing of other objects more distant from said cane user than said first-mentioned objects.

3. The invention of claim 2 wherein said preselected orientation of said cane is substantially the same as the orientation of said cane during its said normal operations wherein said cane user is ambulating.

4. The invention of claim 2 wherein, at the time of said preselected orientation of said cane, said longitudinal axis of said cane is generally vertically disposed.

5. The invention of claim 2, wherein said relatively short distance is approximately equal to a distance that is three feet horizontally spaced from the extended cane-grasping hand of said cane user, and the range sensitivity of said energizable means for more distant objects is at least 24 feet from said object sensing means.

6. The invention of claim 2 wherein said energizable means additionally includes means for generating a radio signal responsive to sensing any such object and wherein said invention additionally includes means for receiving said radio signal adapted to be mounted adjacent an ear of said cane user to provide a correlated audible signal to said cane user.

7. The invention of claim 6, wherein said means for generating a radio signal includes a signal transmitting antenna disposed along an outer surface of said cane handle portion such that is readily comes in contact with the hand of a cane user when grasping said handle portion.

8. The invention of claim 2 wherein said energizable means additionally includes means for broadcasting a signal responsive to sensing any such object.

9. The invention of claim 2, wherein said energizable means includes transducer support means for pivotally mounting said transducer on said mobility cane, said support means being pivotable between a first fixed position where it facilitates the detection of elevated obstacles, a position where said support means engages and is maintained against an adjustable movement limiting stop by manually adjustable frictional forces, and a second fixed position where it facilitates the detection of relatively remote objects, said support means being maintained in said second fixed position by a pivotal-movement arresting detent.

10. A two-piece mobility cane for use by a visually impaired person, comprising:
    a handle portion having a longitudinal axis;
    an elongated shank portion mechanically coupled to and projecting from said handle portion along said longitudinal axis, said cane intended to be extended from a cane user, during normal operations wherein said cane user is ambulating, so that its said longitudial axis is inclined generally at a predetermined acute angle to the ground;
    energizable means on said cane for sensing objects disposed at relatively short distances in front of said cane user and suspended at elevations below the height of said cane user, said energizable means including a transducer mounted on said handle portion aligned to direct a beam of sonar energy from said cane along a line of direction disposed at a predetermined angle to said longitudinal axis and lying in substantially the same vertical plane with said longitudinal axis when said cane is being employed in its said normal operations;
    manually actuatable means for changing the beam direction orientation of said transducer on said cane relative to its said longitudinal axis so that it will be operative to direct said beam of energy in a direction generally parallel to said longitudinal axis after said shank portion has been uncoupled from said handle portion; and means responsive to the manual actuation of said transducer orientation changing means for substantially increasing the range sensitivity of said energizable means to facilitate the sensing of other objects more distant from said cane user than said first-mentioned objects.

11. A mobility cane for use by a visually impaired person, comprising:

a handle portion;

an elongated shank portion projecting from said handle portion along a longitudinal axis, said cane intended to be extended from a cane user, during normal operations wherein said cane user is ambulating, so that its said longitudinal axis is inclined generally at a predetermined acute angle to the ground; and energizable means on said cane for sensing objects disposed at relatively short distances in front of said cane user and suspended at elevations below the height of said cane user, said energizable means including a transducer aligned to direct a beam of ultrasonic energy from said cane along a line of direction disposed at a predetermined angle to said longitudinal axis and lying in substantially the same vertical plane with said longitudinal axis when said cane is being employed in its said normal operations, said energizable means additionally including, means for broadcasting a radio signal responsive to sensing any such object, a radio signal receiver adapted to be mounted adjacent an ear of the cane user for receiving said radio signal and providing an audible signal to said cane user, and a signal transmitting antenna disposed along the outer surface of said cane handle portion such that it readily comes in contact with the hand of a cane user when said user grasps said cane handle portion in a conventional manner whereby said cane user's body becomes an extension of said antenna to thereby enhance signal coupling between said radio signal generating means and said radio signal receiving means.

* * * * *